3,521,460
TWO-STAGE AIR COOLING METHOD AND APPARATUS
James A. Knowles, Arcadia, Calif.
(632 Monterey Pass Road, Monterey Park, Calif. 91754)
Filed July 17, 1968, Ser. No. 745,542
Int. Cl. F25d 17/06
U.S. Cl. 62—95                                    4 Claims

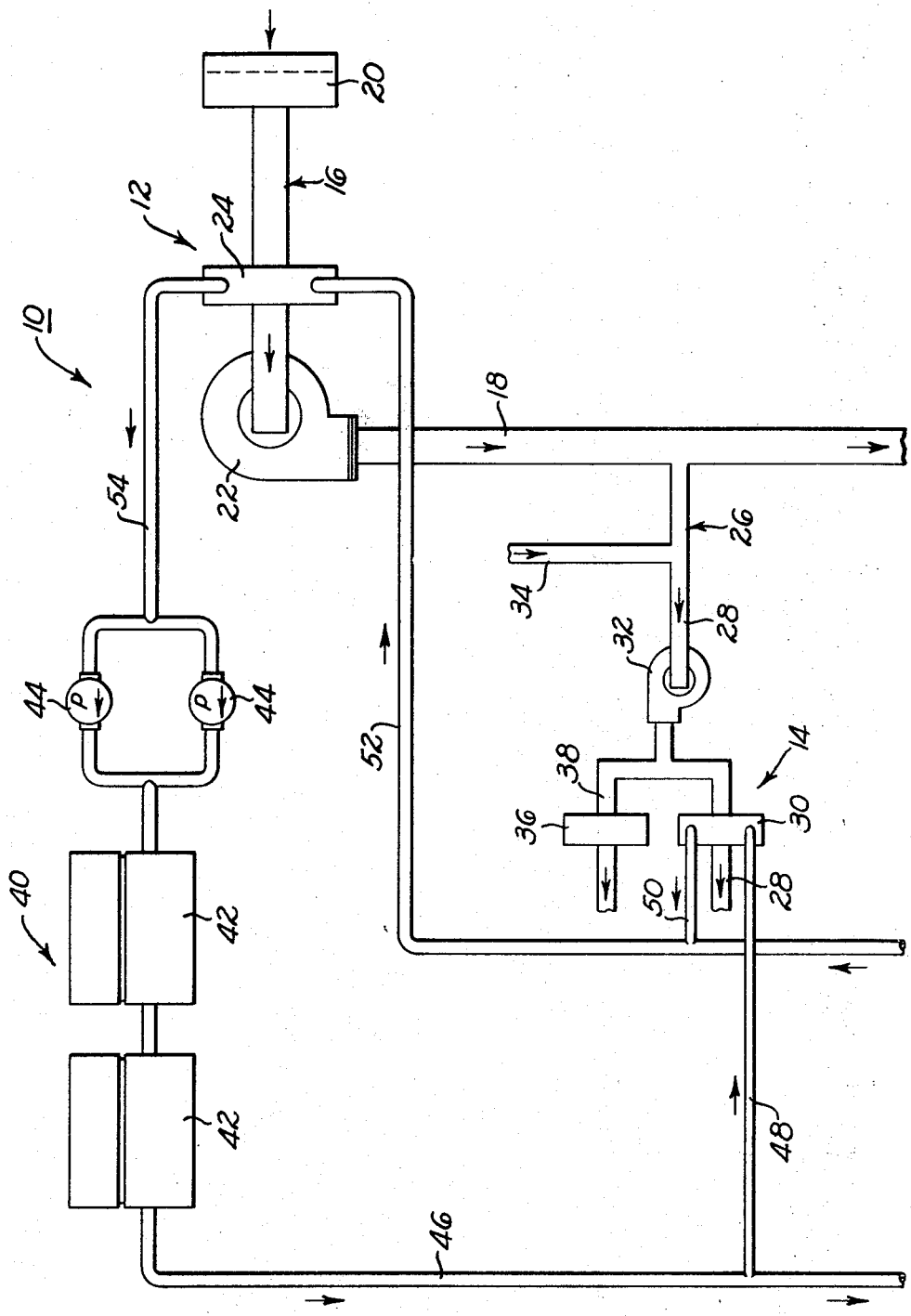

ABSTRACT OF THE DISCLOSURE

An air cooling system for a building, or the like, which involves precooling the outside air supply entering the building at a central location, and then further cooling the precooled air at various local stations corresponding to various parts of the interior of the building as the air is distributed to such parts of the building. Chilled water is used as the cooling medium and heat is transferred to the coolant at the local cooling stations first, the total flow of coolant then being directed to the central cooling station to precool the outside air supply entering the building. Return air from the various parts of the building is mixed with the precooled air distributed thereto and is cooled along with the precooled air at the local cooling stations.

BACKGROUND OF INVENTION

The present invention relates in general to a method of and apparatus for cooling the air in a building, or the like.

Conventional air cooling systems are single-stage systems which transfer heat from the air to a cooling medium either at a central cooling location, or at local cooling stations in various parts of the building, such as the various floors thereof. In the case of a single-stage local cooling system, large coolant lines, heat exchangers, blowers, and the like, are required throughout the building.

SUMMARY AND OBJECTS OF INVENTION

With the foregoing background in mind, a primary object of the present invention is to provide a two-stage air cooling process and system.

More particularly, an important object of the invention is to provide a process and system which precool the outside air supply entering the building at a convenient central cooling location, and which subsequently further cool the precooled air at various local cooling stations throughout the building as the air is delivered to corresponding parts, e.g., floors, of the buidling.

A further object is to transfer heat to a common cooling medium, preferably chilled water, at both the central and local cooling stations.

Another important object of the invention is to circulate the coolant to the local cooling stations first, and, then, to circulate the combined coolant return flow from the various local cooling stations to the central cooling station to precool the incoming outisde air before the combined coolant flow from the local cooling stations is returned to the coolant cooling means.

Still another object is to cool the return air from the various floors or other parts of the building at the local cooling stations.

With the foregoing construction, since the outside air supply is precooled at the central cooling location, the chilled water or other coolant lines leading to the various local cooling stations distributed throughout the building are of reduced size, as compared to a single-stage local cooling system, which is an important feature. Also, precooling the outside air supply permits the use of smaller heat exchangers at the local cooling stations since the heat in the outside air supply is removed at the central location instead of at the local stations. A further advantage is that the outside air supply duct, through which the precooled outside air flows, requires less insulation than in a single-stage central system since the temperature differential between the air flowing therethrough and the air in the building is reduced.

Still another important object of the invention is to provide an air cooling method and apparatus wherein the chilled water experiences a large temperature increase at each local cooling station and experiences a large over-all temperature increase at the local and central cooling locations. The large rise in the temperature of the chilled water at each local cooling station is important because it further reduces the sizes of the chilled water lines required throughout the building, and also further reduces the sizes of the heat exchangers required at the various local cooling stations. The large over-all temperature rise is important because it results in increased thermal efficiency for the water chilling or cooling means, which preferably comprises conventional water chillers. An additional benefit is a reduction in electric power consumption since smaller electric motors may be used throughout the system due to the increased efficiency of the water chillers and the reduced quantity of water circulated.

Considering another important advantage, since the chilled water or other coolant flows first through the local cooling stations and then through the central cooling station, while the outside air being cooled flows first through the central cooling location and then through the local cooling stations, there is over-all counter-current flow between the coolant and the outside air being cooled. Consequently, there is a high temperature differential between the coolant and the outside air being cooled at all cooling locations in the system.

The foregoing objects, advantages, features and results of the present invention, together with various other objects, advantages, features and results thereof which will be evident to those skilled in the air cooling art in the light of this disclosure, may be achieved with the exemplary embodiment of the invention illustrated in the accompanying drawing and described in detail hereinafter.

DESCRIPTION OF DRAWING

The single figure of the drawing illustrates diagrammatically a two-stage air cooling apparatus or system of the invention which is capable of carrying out the two-stage air cooling method or process of the invention.

DESCRIPTION OF EXEMPLARY EMBODIMENT OF INVENTION

In the drawing, the two-stage building air cooling system of the invention is designated generally by the numeral 10 and includes a central cooling station 12 and a plurality of local cooling stations 14 through which outside air being cooled and a coolant, preferably chilled water, for cooling it flow in opposite directions. Only one of the local cooling stations 14 is shown in the drawing and cools the air in a particular part of the building, such as one floor thereof. Identical local cooling stations cool the air in other, corresponding parts of the building.

Considering the two-stage air cooling system 10 of the invention in more detail, it includes an outside air supply means 16 for supplying outside air to the building from the exterior thereof. The outside air supply means 16 includes an outside air supply duct 18 which communicates with the exterior of the building through a filter means 20 and which extends throughout the building past the various local cooling stations 14. For example, the outside air supply duct 18 may extend the full height of the building in the event that the building is a multistory building having the local cooling stations 14 on the various floors thereof. Filtered outside air is circulated through the outside air supply duct 18 by a blower or fan means 22, and passes through a precooling means or heat exchanger 24 at the central cooling location 12.

The two-stage air cooling system 10 also includes air distributing means 26 for distributing outside air from the outside air supply duct 18 to the various floors, or other parts of the interior of the building. More particularly, at each local cooling station 14, an air distributing duct 28 communicates with and receives precooled outside air from the outside air supply duct 18, and delivers same to the corresponding floor or other part of the building through a local cooling means or heat exchanger 30. A local blower or fan means 32 circulates precooled air from the outside air supply duct 18 through the air distributing duct 28, and also draws warm, return air, from the space served by the local cooling station 14 in question, through a return air duct 34.

(The local blower means 32 also circulates air through a heating means 36 in a branch air distributing duct 38. Suitable thermostat controlled air mixing means, not shown, may be provided to mix cooled and heated air flowing through the heat exchanger 30 and the heating means 36 to provide the air delivered to the corresponding part of the building with precisely the desired temperature.)

The two-stage air cooling system 10 further includes coolant cooling means 40 for extracting heat from the coolant circulating through the local-cooling heat exchangers 30 and the central, precooling heat exchanger 24. As indicated previously, the cooling medium is preferably water and the coolant cooling means preferably comprises suitable water chilling means, shown as two conventional water chillers 42 in series. Suitable pumps 44, shown as connected in parallel, circulate the water throughout the chilled water system.

The chilled water emerges from the series-connected water chillers 42 at a relatively low temperature, e.g., 43° F., and flows through a chilled water supply line 46 which serves all of the local cooling stations 14. At each such station, a branch chilled water supply line 48 leads to the corresponding heat exchanger 30. The chilled water experiences a substantial temperature rise in each heat exchanger 30, and may emerge therefrom, through a branch chilled water return line 50, at a considerably elevated temperature, e.g., 59° F. As previously explained, this has important advantages since it minimizes the sizes of the various chilled water lines.

The various branch chilled water return lines 50 communicate with a common main return line 52 which conducts the chilled water to the precooling heat exchanger 24. The water emerging from the precooling heat exchanger 24 is conducted by a line 54 to the pumps 44 for recirculation. The chilled water experiences a relatively small temperature rise in passing through the precooling heat exchanger 24. For example, it may emerge therefrom at a temperature of 63° F. However, since all of the chilled water passes through the heat exchanger 24, a significant quantity of heat is added thereto. Also, since the heat exchanger 24 operates at relatively high temperature differentials and levels, its size is reduced. Since the chilled water may emerge from the water chillers 42 at a temperature of, for example, 43° F., there is a substantial temperature differential across the water chillers, which increases the efficiency of operation thereof also.

Considering illustrative air temperature values, the outside air from the exterior of the building may enter the precooling heat exchanger 24 at 95° F. and emerge therefrom at 72° F. At each local cooling station 14, the precooled outside air at 72° F. may be mixed with return air at, for example, 84° F., and the resulting mixture may have its temperature reduced in the corresponding local-cooling heat exchanger 30 to, for example, 55° F. This locally cooled air may be mixed with heated air from the heating means 36, if necessary, to attain the desired temperature within the part of the building served by the particular local cooling station in question.

It will be understood that the foregoing numerical values for the temperatures of the chilled water and the air being cooled throughout the system are illustrative only. The components of the system may be so selected as to result in other temperatures for the chilled water and the air being cooled.

Although I have disclosed an exemplary embodiment of the air cooling system of the invention, which is capable of performing the air cooling process of the invention, and which is capable of achieving the various advantages and results hereinbefore outlined, it will be understood that various changes, modifications and substitutions may be incorporated in such embodiment without departing from the scope of the invention as hereinafter defined.

I claim as my invention:

1. A two-stage air cooling process for a building, or the like, including the steps of:
    (a) supplying outside air to the building from the exterior thereof;
    (b) then distributing the outside air supply to various parts of the interior of the building;
    (c) transferring heat from the air distributed to said parts of the interior of the building to a coolant at corresponding locations to cool the distributed air; and
    (d) transferring heat from the outside air supply to the same coolant to precool the outside air supply, after having transferred heat from said distributed air to said coolant at said locations.

2. An air cooling process according to claim 1 including the additional step of transferring heat from return air from said parts of the interior of the building to said coolant at said corresponding locations, respectively.

3. In a two-stage air cooling system for a building, or the like, the combination of:
    (a) outside air supply means, including an outside air supply duct communicating with the exterior of the building, for supplying outside air to the building from the exterior thereof;
    (b) air distributing means, including a plurality of air distributing ducts communicating with said outside air supply duct and respectively leading to different parts of the interior of the building, for distributing outside air from said outside air supply duct to the interior of the building;
    (c) precooling means in the line of said outside air supply duct for precooling outside air flowing therethrough;
    (d) a plurality of local cooling means respectively in the lines of said air distributing ducts for further cooling precooled air flowing therethrough;
    (e) coolant cooling means; and
    (f) coolant circulating means for circulating a plurality of coolant flows from said coolant cooling means first to said local cooling means, respectively, and for then circulating the combined coolant flows from said local cooling means to said precooling means.

4. A two-stage air cooling system according to claim 3 including return air ducts respectively communicating with said parts of the interior of the building and respectively leading to said air distributing ducts upstream from said local cooling means.

References Cited

UNITED STATES PATENTS

| | | | |
|---|---|---|---|
| 1,945,441 | 1/1934 | Miller | 62—97 |
| 2,030,032 | 2/1936 | Keyes | 62—406 |
| 2,085,964 | 7/1937 | Fonda | 62—97 |
| 2,292,358 | 8/1942 | Durbin | 165—22 |
| 2,548,665 | 4/1951 | Grant | 62—185 |
| 2,872,858 | 2/1959 | Caldwell | 165—22 |
| 3,102,399 | 9/1963 | Meckler | 62—97 |

WILLIAM J. WYE, Primary Examiner

U.S. Cl. X.R.

62—96, 97, 99, 419; 165—22

UNITED STATES PATENT OFFICE
CERTIFICATE OF CORRECTION

Patent No. 3,521,460                                        July 21, 1970

James A. Knowles

It is certified that error appears in the above identified patent and that said Letters Patent are hereby corrected as shown below:

Column 1, line 50, "buidling" should read -- building --.
Column 2, line 2, "2,292,358" should read -- 2,292,335 --.

Signed and sealed this 23rd day of February 1971.

(SEAL)
Attest:

Edward M. Fletcher, Jr.                           WILLIAM E. SCHUYLER, JR.
Attesting Officer                                           Commissioner of Patents